United States Patent
O'Connell et al.

(10) Patent No.: US 8,996,973 B2
(45) Date of Patent: Mar. 31, 2015

(54) ENHANCING ACCURACY OF SERVICE LEVEL AGREEMENTS IN ETHERNET NETWORKS

(75) Inventors: Anne G. O'Connell, Cork (IE); Con D. Cremin, Cork (IE)

(73) Assignee: Mingoa Limited, Cork (IE)

( * ) Notice: Subject to any disclaimer, the term of this patent is extended or adjusted under 35 U.S.C. 154(b) by 73 days.

(21) Appl. No.: 13/703,763

(22) PCT Filed: Jun. 12, 2010

(86) PCT No.: PCT/EP2010/003553
§ 371 (c)(1),
(2), (4) Date: Dec. 12, 2012

(87) PCT Pub. No.: WO2011/154024
PCT Pub. Date: Dec. 15, 2011

(65) Prior Publication Data
US 2013/0091408 A1  Apr. 11, 2013

(51) Int. Cl.
*H03M 13/47* (2006.01)
*G06F 11/00* (2006.01)
*H04L 12/24* (2006.01)
(Continued)

(52) U.S. Cl.
CPC .......... *G06F 11/006* (2013.01); *H04L 41/5009* (2013.01); *H04L 43/0841* (2013.01); *H04L 43/16* (2013.01)
USPC .......................................... 714/819; 714/776

(58) Field of Classification Search
CPC ..... H04L 1/0057; H04L 1/0061; H04L 43/50; H04L 12/2697; H03M 13/43; H03M 13/19; G06F 11/3409; G06F 11/0745
See application file for complete search history.

(56) References Cited

U.S. PATENT DOCUMENTS

| 7,016,309 B1 | 3/2006 | Rathi et al. |
| 7,689,697 B2 * | 3/2010 | Chiba ........................... 709/227 |

(Continued)

FOREIGN PATENT DOCUMENTS

| GB | 2 461 966 | 1/2010 |
| WO | WO 03/036889 | 5/2003 |

OTHER PUBLICATIONS

International Search Report for PCT/EP2010/003553 mailed Sep. 3, 2010.

(Continued)

*Primary Examiner* — April Y Blair
*Assistant Examiner* — Dipakkumar Gandhi
(74) *Attorney, Agent, or Firm* — Simon Kahn

(57) ABSTRACT

A method of determining frame loss between two management points (C, D) in an Ethernet network, in which the management points each transmit frames to each other and each of the two management points transmits to the other, in regular intervals, measurement messages which contain current counts of frames transmitted and received by the respective transmitting management point. At least one of the two management points responds to a received management message to compute from counts of actual packets transmitted and/or received by a given one of the management points the frame loss at the given management point. At least one of the management points computes the frame loss only once in a measurement interval which consists of a multiplicity of the regular intervals and employs in the computation the counts indicated by the measurement message most recently received by the one of the management points.

12 Claims, 7 Drawing Sheets

OAM engine operating as switch co-processor

(51) Int. Cl.
*H04L 12/26* (2006.01)
*H03M 13/27* (2006.01)

(56) References Cited

U.S. PATENT DOCUMENTS

| | | | |
|---|---|---|---|
| 8,229,705 B1* | 7/2012 | Mizrahi et al. | 702/182 |
| 2005/0063479 A1* | 3/2005 | Propp et al. | 375/260 |
| 2006/0092847 A1* | 5/2006 | Mohan | 370/241.1 |
| 2008/0080390 A1 | 4/2008 | Ebuchi et al. | |
| 2010/0020698 A1* | 1/2010 | Kondo | 370/241.1 |
| 2010/0040050 A1 | 2/2010 | Johnston | |
| 2010/0260054 A1* | 10/2010 | Habib et al. | 370/252 |

OTHER PUBLICATIONS

Written Opinion of the International Searching Authority mailed Sep. 3, 2010.

* cited by examiner

| Service Class | Service Characteristics | SLA parameters |
|---|---|---|
| Premium | Real time telephony or IP Video applications | Frame Loss Ratio < 0.001%<br>Frame Delay < 5ms<br>Jitter < 1ms |
| Silver | Bursty mission critical data applications requiring low loss and latency e.g. storage | Frame Loss Ratio < 0.01%<br>Frame Delay < 5ms<br>Jitter < Non Specific |
| Bronze | Bursty data applications requiring bandwidth assurances | Frame Loss Ratio < 0.1%<br>Frame Delay < 15ms<br>Jitter < Non Specific |
| Standard | Best Effort service | Frame Loss Ratio < 0.5%<br>Frame Delay < 30ms<br>Jitter < Non Specific |

Figure 1 : Example Service Level Agreements

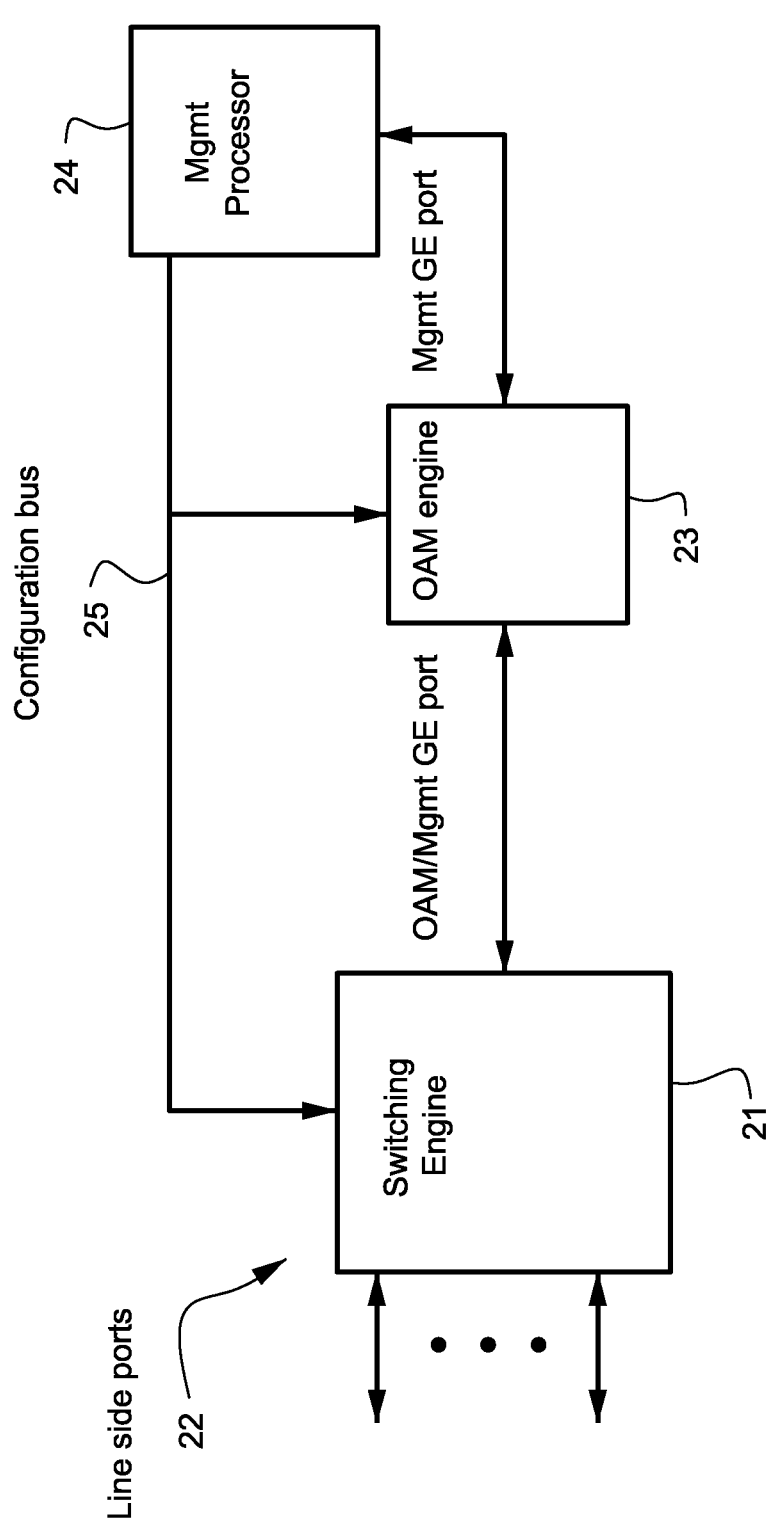
Figure 2 : OAM engine operating as switch co-processor

ES and SES Definitions

| Parameter | ES Trigger | SES Trigger |
|---|---|---|
| Frame Loss Errors | One loss triggers ES | Must exceed a per PM channel Frame Loss Ratio threshold. |
| Frame Delay Errors | Must exceed a per PM channel Frame Delay threshold. One loss in a second triggers ES | Must exceed a per PM channel Frame Delay threshold. A configurable "N" losses in a second triggers SES |
| Frame Delay Variation Errors | Must exceed a per PM channel Frame-Delay Variation threshold One loss in a second triggers ES | Must exceed a per PM channel Frame Delay Variation threshold A configurable "N" losses in a second triggers SES |
| | | |
| Connectivity Loss | Any loss triggers ES | Any loss triggers SES |
| Remote MEP Errors | Any error triggers ES | Any error triggers SES |
| Cross-connect Errors | Any error triggers ES | Any error triggers SES |
| RDI Events | Any occurrence triggers ES | Any occurrence triggers SES |

Figure 7 : ES and SES Definitions

ENHANCING ACCURACY OF SERVICE LEVEL AGREEMENTS IN ETHERNET NETWORKS

This application is the U.S. national phase of International Application No. PCT/EP2010/003553 filed 12 Jun. 2010 which designated the U.S., the entire contents of which is hereby incorporated by reference.

TECHNICAL FIELD

The following relates to Ethernet networks and particularly to Ethernet OAM (Operations, Admin and Maintenance). In particular, it concerns the operation of measuring the performance of a network against agreed 'service level agreements' (SLAs). The metrics defined in an SLA typically concern frame loss, frame delay and frame delay variation. Different thresholds for these metrics are administered for various SLAs.

It is necessary to measure the network performance against these 'service level agreements' in order for the purchaser of a service level agreement to verify the quality of his connection.

BACKGROUND

The standard specifications for operation of Ethernet OAM circuits, and particularly those conforming to IEEE 802.1ag and ITU-T Y.1731, include a check for connectivity between two management endpoints (MEPs) in a management domain (MD). The management endpoints perform the check by means of the periodic transmission of connectivity check messages (CCMs) to each other. Both endpoints determine whether they have received a valid CCM within a prescribed time. The period, i.e. the interval between CCM transmissions, can be, under current specifications, any one of eight values starting from 3.3 ms up to 10 minutes. The period may be configured, i.e. selected for each connection. A connectivity error is reported by an endpoint when a CCM has not been received from the end point's partner within a set multiple (presently 3.5) of the CCM transmission interval. Thus at the fastest CCM rate (3.3 ms) an error will be reported when a message from the partner is not received within 3.5×3.3=11.55 ms.

There can be a multiplicity of operational levels at which a management point (MP) in general and a management endpoint (MEP) in particular can operate (currently 8) and the operational level typically defines the range of the monitored connection, higher numbers indicating the longer ranges.

CCM messages can also detect errors in configuration of the network path. These errors are referred to as 'cross connect errors' and 'remote MEP errors'. Cross connect errors occur when a receiver does not recognise the domain. The domain is defined in a field in the CCM packet called a maintenance domain ID (MAID). They may also occur if the CFM level of the received CCM packet is lower than expected. Remote MEP errors occur if the receiver does not recognise the identity of the transmitter (defined in a field called the MEPID) or if the detected MEPID is its own MEPID, indicating that a packet was looped back on itself.

The performance of the network can be measured according to standards such as ITU Y.1731. This standard defines techniques to measure frame loss, frame delay and frame delay variation.

Frame loss can be measured in one of two ways. It can be measured simultaneously at both ends of a link (a dual-ended measurement) and proactively using CCM messages. Alternatively, it can be measured at one end of the link (a single-ended measurement) and on demand using a 'loss measurement message' (LMM) and a 'loss measurement response' (LMR). The originator sends an LMM, and it is looped back as a LMR at the far end. When the originator receives the LMR, it can proceed to measure the loss. In both of these methods, the management messages are sent regularly and include counts of the numbers of data packets transmitted and received up to the time the management packet was sent. Frame Loss is calculated by comparing these counter values. Measurement of both 'near end' and 'far end' frame loss can be made. An SLA threshold called 'frame loss ratio' governs the percentage of packets that are permitted to be lost and this is the metric reported.

Frame delay and frame delay variation can be measured in one of two ways also. They can be measured on demand using 'delay measurement messages' (DMMs) and 'delay measurement responses' (DMRs) in cases where the clocks are not synchronised at each end of the link. The originator sends a DMM, and it is looped back as a DMR at the far end. When the originator receives the DMR, it can proceed to measure the delay and delay variation. Alternatively, if the clocks at each end are synchronised, the originator can send a 'one way delay message' (1DM) to the far end, where the delay and delay variation measurements are made. SLA thresholds govern the maximum delay and delay variation values (typically expressed in milliseconds) and this is the metric that is reported.

BRIEF SUMMARY

The exemplary embodiments provide a method of determining frame loss between two management points in an Ethernet network, in which the management points each transmit frames to each other and each of the two management points transmits to the other, in regular intervals, measurement messages which contain current counts of frames transmitted and received by the respective transmitting management point, and in which at least one of the two management points responds to a received management message to compute, from counts of actual packets transmitted and/or received by a given one of the management points, the frame loss at the given management point, The term 'measurement message' is intended to embrace both continuity check messages and loss measurement messages and responses as described above. The exemplary embodiments arrange for at least one of the management points to computes the frame loss only once in a measurement interval which consists of a multiplicity of the regular invervals and to employs in the computation the counts indicated by the measurement message most recently received by the one of the management points.

In one form of the exemplary embodiments, the one of the management points computes only once in the measurement interval the frame loss at its near end (i.e. itself) and its far end (i.e. at the other management point.

Preferably the measurement interval is typically an order of magnitude greater than any of the regular intervals.

In a preferred form the one management point indicates a valid measurement interval only if the measured frame loss exceeds an adjustable threshold.

Further, the one management point may indicate a measurement interval as valid only if a number of packets considered in the computation of frame loss exceeds an adjustable threshold.

The one management point may respond to additional Ethernet errors such as connectivity errors, remote defect indicator errors, remote MEP errors and cross connect errors and may classify each measurement interval according to the number of such errors.

The method described herein has three main features. They are of independent utility, but a preferred method includes at least two and preferably all three. They are configurable oversampling of information for frame loss calculation, the use of minimum measurement floors, and a technique for the reporting of additional Ethernet based errors that feed into the errored events.

(a) Configurable Oversampling of Information for Frame Loss

The Y.1731 standard defines a mechanism to measure frame loss. Frame loss messages are sent at regular intervals, typically at 100 ms intervals, between end points. When the end points receive these messages, they make 'near end' and 'far end' measurements for the most recent 100 ms interval. Making measurements every 100 ms on every monitored service can present a high processing load. The scheme described here reduces the processing load while still maintaining accuracy.

The management messages are still sent at the regular rate, typically every 100 ms, and they include the up to date counter values of the numbers of transmitted and received data frames. However, the frame loss measurement process is calculated at a configurable but slower rate than this, typically every 1 s interval. Therefore in this example, the frame loss measurement process is carried out on the reception of every $10^{th}$ management message. While this rate is slower, it still operates on the counter values associated with the most recent 100 ms interval and so loses none of the accuracy. An alternative method would be to send the management messages every one second interval and then making the loss measurements on every received management messages. However, in this case, the loss measurements are made on counter values that are one second old. This can result in the 'near end' registering an error in a given measurement interval and the 'far end' registering another error in a different interval. It can also result in a near end error that occurred in one interval and a far end error that occurred in a different interval both being reported in the same interval. The overall action results in inaccurate reporting.

Oversampling, for example by one order of magnitude, ensures that the 'near end' and 'far end' events are resolved with satisfactory accuracy, correlating both ends into a single measurement interval and leading to better quality of reporting.

(b) Minimum Measurement Floors

There may be two floors employed during the measurement process. Both are configurable. They both filter out measurements that could be made with inaccurate amounts of data, Frame loss ratio is calculated by the following equation Frame Loss=(num$Tx$−num$Rx$)/num$Tx$ A first configurable floor, minNumTx, controls the minimum number of transmitted frames that must be seen in order to take a measurement. There must be a sufficiently large sample size in order to make a valid measurement. For example, if the link is operating at 1 Gbits/second, then there is a maximum rate of 1.6 million packets per second. However, given the nature of Ethernet, the minimum packet rate could be 0 packets per second or a very low number during the measurement interval between successive LMM/LMR/CCM management messages. For example, if the number of packet sent is only 6 in the interval, and one of those is lost, then a measured loss of 16% would be made, which is not accurate or reflective of the normal cases of average packet rates.

A second configurable floor, minAccLoss, is to filter errors due to stale counter values. This is applicable when an OAM engine is operating as a co-processor behind a switch, processing OAM information on behalf of all the switch ports (FIG. 2). In this case, the switch maintains the data counters as it operates on the data plane. The OAM engine must read these counters from the switch for loss measurements and the latency associated with this read action can lead to a certain degree of staleness in the counter values. The floor compensates for the staleness such that if the measured loss is below the floor value, then the loss is instead reported as zero.

(c) Reporting of Additional Ethernet Based Errors

Y.1731 measures Ethernet errors such as connectivity errors, remote defect indicator errors, remote MEP errors and cross connect errors. There is no standardised method of reporting these errors. The method described includes one such reporting mechanism that ties in with the concept of errorred seconds introduced above. For each monitored service, the hardware samples the state of these errors every sampling period (typically 1 second but configurable as stated above. An interval is declared to be 'errored second' (ES) or 'severely errored second' (SES). The ES and SES events may be derived every second There follows a detailed description of an exemplary method, with reference to the drawings.

BRIEF DESCRIPTION OF THE DRAWINGS

FIG. 1 is a table showing example of service level agreements.

FIG. 2 illustrates schematically an OAM engine operating as a switch co-processor.

FIG. 7 illustrates a scheme for the classification of errored intervals, particularly 'errored seconds'.

DETAILED DESCRIPTION OF EXEMPLARY EMBODIMENTS

Figure 3:
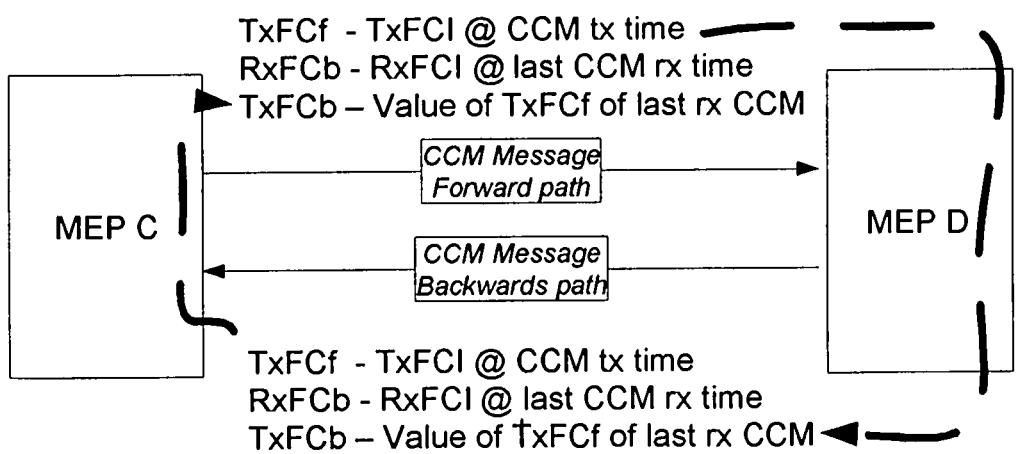
FIG. 3 illustrates frame loss measurement using CCMs.

FIG. 1 illustrates a multiplicity of 'service levels' in a left column, the characteristics of the service in the middle column and the SLA parameters in the right-hand column. The levels are arbitrarily termed, in decreasing level of prescribed performance, 'Premium', 'Silver', 'Bronze' and 'Standard'.

The lowest level, 'Standard' is merely a 'best effort service', the parameters being a frame loss ratio specified to be less than 0.5%, a frame delay specified to less than 30 ms and an unspecific tolerance for jitter (frame delay variation).

The 'Bronze' service may be appropriate for bursty data applications which require some assurance of the availability of sufficient bandwidth. Here the frame loss ratio is specified to be less than 0.1%, the frame delay is specified to less than 15 ms and the tolerance for jitter is unspecified.

The 'Silver' service may be appropriate for bursty 'mission critical' data applications which require low loss and low latency. Here the frame loss ratio is specified to be less than 0.01%, the frame delay is specified to less than 5 ms and the tolerance for jitter is unspecified.

Finally, the 'Premium' service is appropriate for real time telephony or IP video applications. Here the frame loss ratio is specified to be less than 0.001%, the frame delay is specified to less than 5 ms and the jitter is specified to be less than 1 ms.

FIG. 2 illustrates one example of hardware in which the invention may be performed. It comprises a switching engine 21 which has line side ports 22, an OAM engine 23, a management processor 24 and a configuration bus 25 coupling the management processor 24 to the switching engine 21 and the OAM engine 22.

FIG. 3 illustrates frame loss measurements using CCMs.

The standard ITU Y.1731 states that performance measurement CCMs are to be exchanged from one MEP, e.g. MEP C in FIG. 3, to its peer, e.g. MEP D in FIG. 3, to facilitate frame loss measurements at the peer MEP D.

In FIG. 3, the subscript 'f' represents the forward path from C to D and the subscript 'b' represents the backward path from D to C. The quantity 'TxFCl' is a count of the number of packets sent to a peer MEP. The quantity RxFCl is a count of the number of packets received by the peer MEP.

In FIG. 3 there is a forward path for CCM messages from C to D and a return path for CCM messages from D to C.

For messages on the forward path, three quantities are relevant. The quantity TxFCf is the value of TxFCl, i.e. the number of packets that have been sent by MEP C at the transmit time of the CCM. The quantity RxFCb is the number of packets received by the MEP C at the reception time of the last CCM from MEP D. The quantity TxFCb is the value of TxFCf in the last received CCM from MEP D. The same quantities are relevant for messages on the backwards path.

For frame loss measurement at the MEP D:

$$\text{Near End Loss} = Tx(C-D) - Rx(C-D) \quad \text{(i)}$$

$$\text{Far End Loss} = Tx(D-C) - Rx(D-C) \quad \text{(ii)}$$

Figure 4:
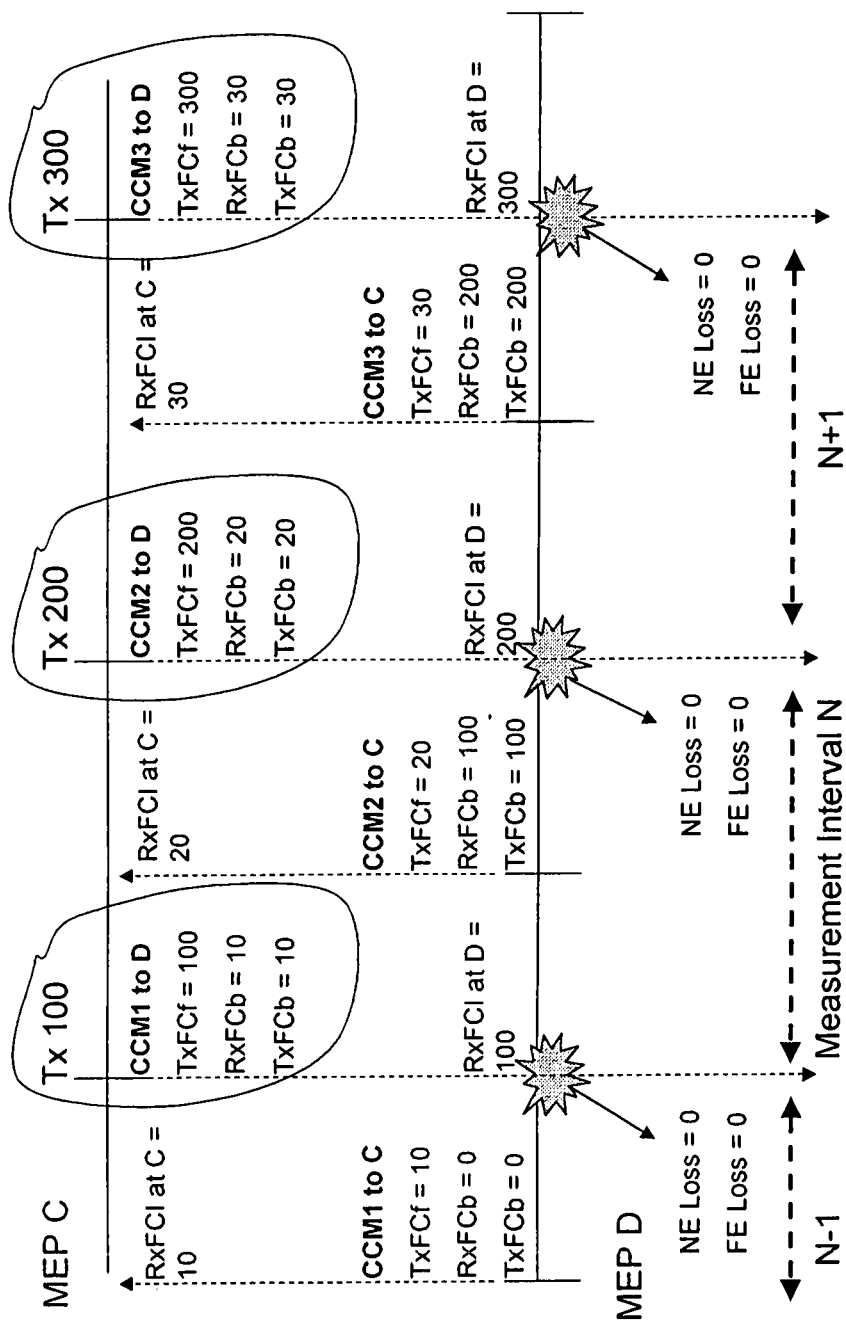
FIG. 4 illustrates frame loss measurement in circumstances exhibiting no loss.

FIG. 4 illustrates frame loss measurement using CCMs and measurement at one second intervals in circumstances where there is no loss. FIG. 4 presumes that 10 packets per second are sent from MEP D to C and that 100 packets per second are sent from MEP C to MEP D. In FIG. 4, CCMs from MEP D to MEP C are denoted by the upward chained arrows and CCMs from MEP C to MEP D are denoted by the downward chained arrows.

It is assumed in this example that MEP D makes both far end and near end measurements of frame loss.

The left-hand column in FIG. 4 shows the transmission (in the interval 'N−1') from D to C of a CCM (denoted 'CCM1 to C').

The number of transmitted packets up to this point is (arbitrarily) 10 which is the quantity TxFCf-D. The number of packets (RxFCb) received by MEP D at the time of the last received CCM is 0 (zero). The number of transmitted packets from C reported in the last received CCM from C (TxFCb-D=last TxFCf-C) is likewise 0 (zero).

When the MEP C receives this CCM, i.e. CCM1, it latches the number of packets it has received from MEP D up to that point, i.e. RxFCl-C, equal to 10.

In the next interval N, the MEP C transmits a CCM (CCM1 to D) to the MEP D. The number of transmitted packets up to this point is (for example) 100, so TxFCf-C=100.

The number of received packets at the time of the last received CCM=10 (RxFCb=RxFCl-C). The number of transmitted packets from D reported in the last received CCM from D is 10 (TxFCb-C=last TxFCf-D).

When the MEP D receives 'CCM1 to D' it latches the number of packets it has received from MEP C up to that point, i.e. 100=(RxFCl-D). It calculates the Near End and Far End losses in accordance with equations (i) and (ii) above.

The near end loss=(100−0)−(100−0)=0. The far end loss=(10−0)−(10−0)=0.

The same process is repeated for the subsequent intervals as shown in FIG. 4.

Figure 5:
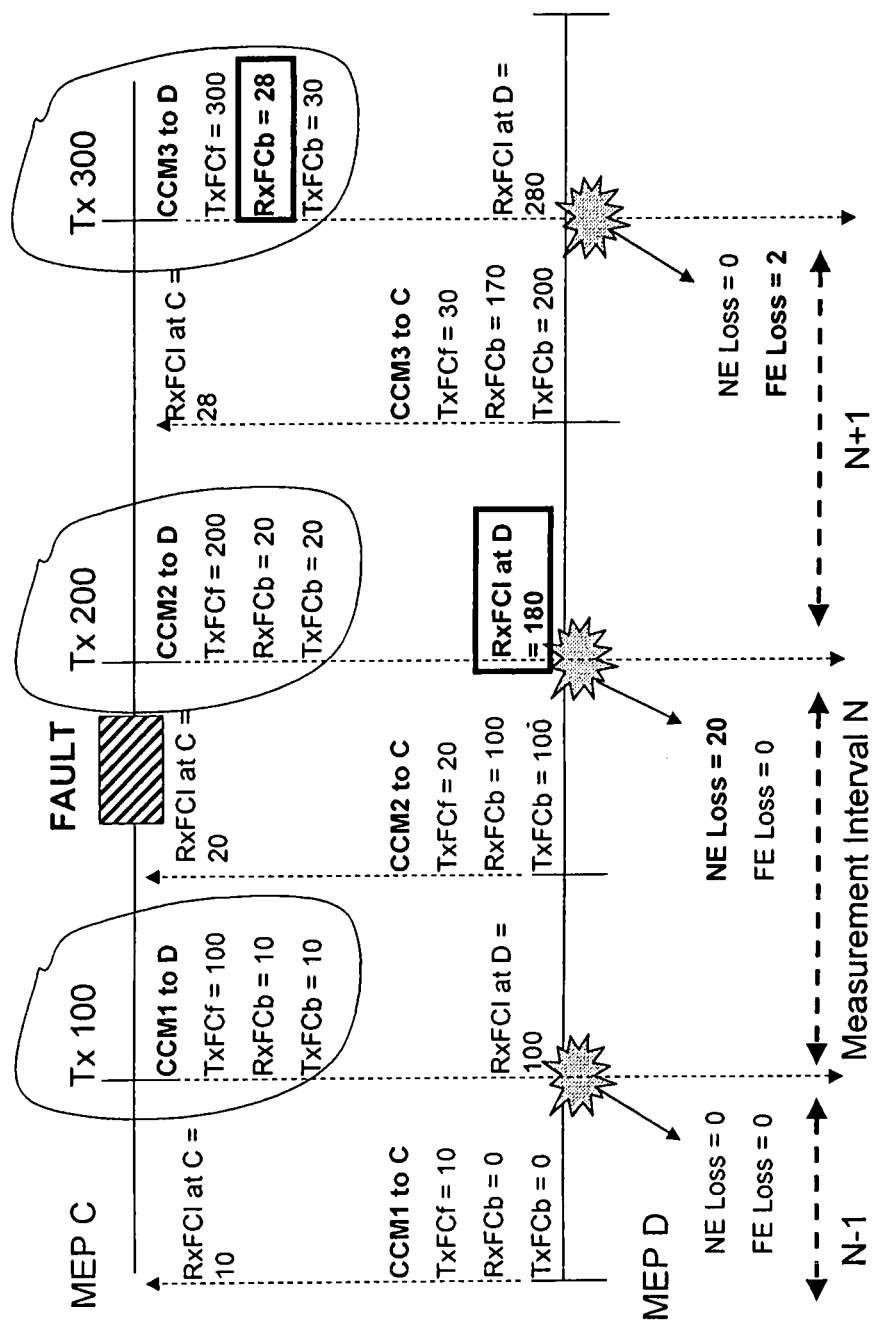
FIG. 5 illustrates frame loss measurement in the presence of a fault.

FIG. 5 illustrates frame loss measurement with near end and far end losses in adjacent intervals for the same fault, which in this example causes a loss of 20 packets in the transmission from MEP C to MEP D and a loss of 2 packets in the transmission from MEP D to MEP C.

The process shown in FIG. 5 is the same as that in FIG. 4 for the first shown interval (N−1).

In interval N the MEP D transmits as before a CCM to MEP C i.e. CCM2 to C. At MEP D, the number of transmitted packets up to this point is 20 (TxFCf-D). The number of received packets at the time of the last received CCM=100 (RxFCb D). The number of transmitted packets from C reported in the last received CCM from C is 100 (TxFCb-D=last TxFCf-C).

When MEP C receives this CCM it latches the number of packets it has received from MEP D up to that point, i.e. 20=(RxFCl-C).

Now MEP C transmits a CCM to MEP D. This CCM is 'CCM2 to D'. At MEP C, the number of transmitted packets up to this point is 200 (TxFCf-C). The number of received packets at the time of the last received CCM is 20 (RxFCb=RxFCl-C). The number of transmitted packets from D reported in the last received CCM from D is 20 (TxFCb-C=last TxFCf-D).

When MEP D receives this CCM it latches the number of packets it has received from C up to that point. This is 180 (RxFCl-D).

MEP D calculates the near end and far end losses:

$$\text{Near end loss} = (200-100) - (180-100) = 20$$

$$\text{Far end loss} = (20-10) - (20-10) = 0.$$

It will be noted that the far end loss is inaccurate.

After the exchange of the CCM3 packets, MEP D can detect a far end loss in the interval N+1. As noted previously this is an interval different from the interval for which the near end loss has been computed.

Figure 6:
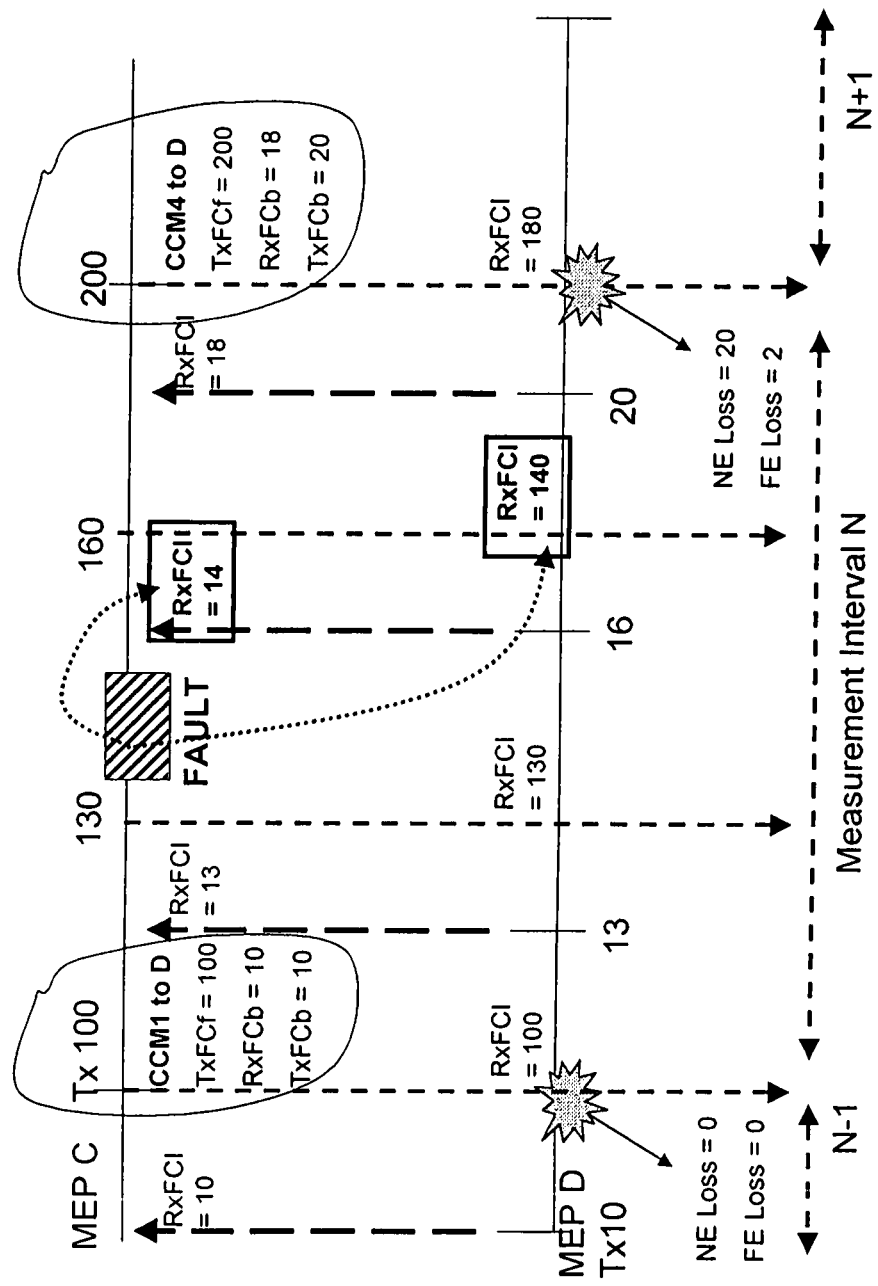
FIG. 6 illustrates frame loss measurement using oversampling in accordance with the invention.

FIG. 6 illustrates one example of an oversampling scheme wherein the management messages are still sent at the same rate and include the up-to-date aggregates (as indicated in the frame counters) of the transmitted and received frames. However, the frame loss measurement is conducted at a slower, preferably selectable, rate, so that frame loss is computed for every Nth CCM where N>1 and may typically be 10. Thus for example the CCM rate may be one each 100 ms and the frame loss measurements may be made every 1 s.

In FIG. 6, CCMs from MEP D to MEP C are denoted by the upward chained arrows and CCMs from MEP C to MEP D are denoted by the downward chained arrows.

After the fault the MEP D transmits a CCM to the MEP C. The number of transmitted packets up to this point is 16 TxFCf-D=16. The number of received packets at the time of the last received CCM is (RxFCb-D)=130. The number of transmitted packets from C reported in the last received CCM from C is (TxFCb-D=last TxFCf-C)=130.

When the MEP C receives this CCM it latches the number of packets it has received from MEP D up to that point, i.e. (RxFCl-C)=14.

Now the MEP C transmits a CCM to the MEP D. The number of transmitted packets up to this point is TxFCf-C=160. The number of received packets at the time of the last received CCM is (RxFCb=RxFCI-C)=14. The number of transmitted packets from D reported in the last received CCM from D is (TxFCb-C=last TxFCf-D)=16.

When the MEP D receives this CCM it latches the number of packets it has received from MEP C up to that point, i.e. (RxFCI-D)=140.

Then the MEP D transmits a CCM to the MEP C. The number of transmitted packets up to this point is (TxFCf-D)=20. The number of received packets at the time of the last received CCM is (RxFCb-D)=140. The number of transmitted packets from C reported in the last received CCM from C is (TxFCb-D=last TxFCf-C)=160.

When the MEP C receives this CCM it latches the number of packets it has received from MEP D up to that point, i.e. (RxFCI-C)=18.

Then the MEP C transmits a CCM to the MEP D. The number of transmitted packets up to this point is (TxFCf-C)=200. The number of received packets at the time of the last received CCM is (RxFCb=RxFCI-C)=18. The number of transmitted packets from D reported in the last received CCM from D is (TxFCb-C=last TxFCf-D)=20.

When the MEP D receives this CCM it latches the number of packets it has received from MEP C up to that point, i.e. (RxFCI-D)=180.

MEP D calculates the near end loss and the far end loss in the same interval:

Near end loss=(200−100)−(180−100)=20

Far end loss=(20−10)−(18−10)=2.

It may be seen therefore that although frame loss is computed only once in a sampling interval which comprises a multiplicity of continuity check intervals, there is no or at most an insignificant loss of accuracy.

The frame losses computed, for example, at MEP D may then be subjected to comparisons with the measurement floors previously mentioned.

In addition, the MEP may respond to additional Ethernet errors such as connectivity errors, remote defect indicator errors, remote MEP errors and cross connect errors and classify each measurement interval as 'errored' (ES) or 'severely errored' (SES) according to the number of such errors.

FIG. 7 shows examples of how the various errors can contribute to an Errored or Severely Errored Second result.

The invention claimed is:

1. A method of determining frame loss between two management points in an Ethernet network, in which said management points each transmit frames to each other and each of said two management points transmits to the other, in regular intervals of less than one second, measurement messages which contain current counts of frames transmitted and received by the respective transmitting management point, and in which at least one of said two management points responds to a received measurement message to compute, from counts of actual packets transmitted and/or received by a given one of the management points, the frame loss at said given management point,
wherein said at least one of the management points computes said frame loss only once in a measurement interval, which consists of a multiplicity of said regular intervals, and employs in the computation the counts indicated by the measurement message most recently received by said one of the management points.

2. The method according to claim 1 in which said one of the management points computes only once in said measurement interval the frame loss at its near end and at its far end.

3. The method according to claim 1 in which said measurement interval is typically an order of magnitude greater than any of said regular intervals.

4. The method according to claim 1, in which said one management point indicates a valid measurement interval only if the measured frame loss exceeds an adjustable threshold.

5. The method according to claim 1, in which said one management point indicates a measurement interval as valid only if a number of packets considered in the computation of frame loss exceeds an adjustable threshold.

6. The method according to claim 1, in which said one management point responds to additional Ethernet errors including at least one of connectivity errors, remote defect indicator errors, remote MEP errors and cross connect errors and classifies each measurement interval according to the number of such errors.

7. Apparatus for determining frame loss between two management points in an Ethernet network, in which said management points each transmit frames to each other and each of said two management points transmits to the other, in regular intervals of less than one second, measurement messages which contain current counts of frames transmitted and received by the respective transmitting management point, and in which at least one of said two management points responds to a received measurement message to compute, from counts of actual packets transmitted and/or received by a given one of the management points, the frame loss at said given management point, said apparatus comprising:
an ethernet operations, administrative and maintenance (OAM) circuit disposed at at least one of said management points and configured to compute said frame loss only once in a measurement interval, which consists of a multiplicity of said regular intervals, and to employ in the computation the counts indicated by the measurement message most recently received.

8. The apparatus according to claim 7 wherein said OAM circuit is configured to compute only once in said measurement interval the frame loss at its near end and at its far end.

9. The apparatus according to claim 7 wherein the measurement interval is at least an order of magnitude greater than any of said regular intervals.

10. The apparatus according to claim 7 in which said OAM circuit is configured to indicate a valid measurement interval only if the measured frame loss exceeds an adjustable threshold.

11. The apparatus according to claim 7 in which said OAM circuit is configured to indicate a measurement interval as valid only if a number of packets considered in the computation of frame loss exceeds an adjustable threshold.

12. The apparatus according to claim 7 in which said OAM circuit is configured to respond to additional ethernet errors including at least one of connectivity errors, remote defect indicator errors, remote MEP errors and cross connect errors and to classify each measurement interval according to the number of such errors.

* * * * *